United States Patent [19]

Albertson et al.

[11] 3,926,818

[45] Dec. 16, 1975

[54] COMPOSITE BEARING MATERIALS

[75] Inventors: Clarence E. Albertson, Villa Park; Robert H. Krueger, Palatine, both of Ill.

[73] Assignee: Borg-Warner Corporation, Chicago, Ill.

[22] Filed: Dec. 16, 1974

[21] Appl. No.: 532,781

[52] U.S. Cl. ............... 252/12.4; 252/12; 308/240; 308/238
[51] Int. Cl.² ................ C10M 5/00; C10M 7/00
[58] Field of Search .......... 252/12, 12.2, 12.4, 12.6; 308/240, 238

[56] References Cited
UNITED STATES PATENTS

| | | | |
|---|---|---|---|
| 1,458,943 | 6/1923 | Kinney | 252/12.6 |
| 3,756,982 | 9/1973 | Korshak et al. | 252/12.4 |
| 3,781,205 | 12/1973 | Cairns et al. | 252/12.4 |
| 3,799,637 | 3/1974 | McCullough et al. | 308/238 |

*Primary Examiner*—Delbert E. Gantz
*Assistant Examiner*—I. Vaughn
*Attorney, Agent, or Firm*—Richard J. Schlott

[57] ABSTRACT

Composite bearing structures are prepared by preparing a pre-form composite having a core or center comprising glass fiber filled resin and at least one surface comprising milled fiber glass and graphite filled resin. When formed and cured into bearings and thrust washers, the composite exhibits improved impact resistance and low wear.

5 Claims, No Drawings

COMPOSITE BEARING MATERIALS

BACKGROUND OF THE INVENTION

The instant invention is a composite structure for use in thrust washer, wear ring and bearing applications. More particularly, the invention comprises a composite structure having outer surfaces comprised of a thermoset resin filled with milled fiberglass and graphite, and a center core comprised of a thermoset resin filled with glass fiber. A thrust washer, wear ring or bearing having improved impact resistance and good surface wear characteristics is made of the composite.

Thrust washers and similar bearing devices are conventionally made from thermoset resins such as phenol-formaldehyde resins, polyimide resins, high temperature amide resins and the like. For purposes of improving impact and load-bearing properties, many of these molding compositions have included modifiers and fillers such as a rubber, together with asbestos or glass fibers, mineral fillers and solid lubricant materials such as graphite or TFE fluoro-polymers. Such compositions, properly formulated and molded, have given bearing materials with good surface properties and low wear. Where a high degree of wear resistance is needed, the compositions are formulated to have the greatest surface hardness which in turn leads to increased glassiness, brittleness and lowered impact properties. Thrust bearings and washers prepared from these materials and having good surface hardness are difficult to handle and there is a high tendency toward breaking during assembly into such devices as automatic transmissions and the like.

A thermoset resin bearing composition for use in thrust washers and similar bearings having the desirable surface hardness and good impact resistance, together with improved wear properties is clearly needed.

SUMMARY OF THE INVENTION

It has now been discovered that molded composite structures having an impact resistant core or center and a glassy surface can be used to make thrust washers and similar bearings. More particularly, it has been found that a composite structure wherein the surface layers are comprised of a thermoset resin filled with milled fiber glass and a solid lubricant and a center or core comprised of a thermoset resin filled with glass fiber, molded in the form of a thrust washer or bearing, has good impact properties and a high degree of resistance to wear under high temperature and high loading conditions.

DETAILED DESCRIPTION OF THE INVENTION

The composite structures of this invention comprises a center or core amounting to about 70% by weight of the total structure, and two surface layers each amounting to about 15% of the total weight of the structure. The relative amounts may be varied, so that the core comprises from about 50 to about 90% by weight of the structure, and each of the surfaces correspondingly from 25 to about 5% of the total weight. It will be recognized that the purpose of the core is to provide improved impact strength to the final structure, and therefore the impact properties of the structure will be detrimentally affected where less than 50% by weight of the core composition is employed.

The core comprises phenolic thermoset resin filled with ¼ glass fiber. The phenolic resins which may be employed for these purposes are the widely known phenol-formaldehyde type thermosetting molding resins, including the phenol-formaldehyde resins which have been modified with such materials as cashew resin, polyamides and rubber. These resins have been widely employed in molded bearing applications. For use in preparing the core of the instant invention, the phenolic resin is compounded with chopped glass-fiber in an amount of from 35 to 60% by weight of the total core composition. The purpose of the glass fiber is to provide reinforcement and improved flexural strength to the core composition and lesser amounts of glass fiber than about 35% by weight give insufficient reinforcement, while greater amounts than about 60% tend to make the final product too rigid and brittle. The preferred range for the purposes of this invention is from about 40 to about 45% by weight of the total resin composition. The glass fiber employed for these purposes is chopped glass fiber, nominally ¼ inch in length, with a strand width of 0.2 to 0.7 mm and a fiber diameter of about 13 microns. Other nominal lengths ranging from one-eighth inch to one-half inch are commercially available and these may also be employed.

Small amounts of processing aids such as wax and graphite, additional additives such as flexibilizers and the like are commonly employed in the compounding of thermoset phenolic resins and these may be used in the instant phenolic compositions.

The outer surfaces of the composite structure comprises a thermoset phenolic resin, a solid lubricant and milled glass fiber. The thermoset phenolic resin may be any of the phenolic resins useful in providing the core composition, and although different resins may be employed in each layer, for production convenience the same resin normally will be employed for both the outer surface and core. The phenolic resin is compounded with milled glass fiber in an amount of from about 20 to about 45% by weight of the total surface layer composition and with solid lubricant in an amount of from about 5 to 15% by weight of the total composition. The solid lubricant may be graphite, molybdenum disulfide, poly(tetrafluoroethylene), and the like, or mixtures thereof. Milled glass fiber is a powdered glass fiber having a diameter of about 12 microns and a nominal length of about 250 microns, obtained commercially by milling glass fiber. The milled glass fiber together with the solid lubricant imparts enhanced surface lubricity and decreased surface wear. As with the core composition, small amounts of processing aids and lubricants including wax, and flexibilizers such as polyamide resins may also be included.

Both compositions will be prepared by powder blending the respective components, employing conventional powder blending techniques. In the case of the core composition it will be recognized that severe blending methods such as ball-milling are to be avoided in order that the chopped glass fiber component not be broken or degraded during blending. The composition employed for the outer surface, however, may be blended either by powder blending methods or by ball-milling methods and the like.

The composite structure of the instant invention may be prepared by first cold forming the powdered materials in successive steps to provide a pre-form of the bearing structure containing the core and outer surfaces, then curing the pre-form by heating under pressure. More specifically, a mold cavity is charged with the requisite amount of composition to form one of the outer surfaces, and the powder is compacted by inserting a plunger and applying pressure. The plunger then is removed and the weight portion of core composition is added to the mold cavity, and compressed as before. Again, the plunger is removed, the weighed amount of the outer surface composition is added, and the total structure is compressed to give a compressed-powder pre-form. The pre-form is then removed from the pre-form mold and placed into a second mold cavity, the mold is assembled and placed in a platen press where heat and pressure are applied to cure the thermoset composition.

It will be understood that the three-step, cold compression molding of the pre-form followed by application of pressure and heat for curing was devised as a laboratory method for making molded thrust washers. Many modifications and adaptations of the described method are possible and will be apparent to one skilled in the art, and the present invention is not limited to any one particular method for producing the layered structures described herein above. Further, a composite structure comprising a core and outer surface layers as described above may be prepared in the form of a sheet or plaque, cured and then machined into a thrust washer or similar bearing.

The practice of the instant invention will be made more readily apparent by means of the following examples, employing specific compositions in the providing of specific embodiments. It will be understood that the following examples are provided by way of illustration and the practice of the instant invention is not limited thereby.

EXAMPLE 1

CORE COMPOSITION

A phenolic-glass fiber composition was prepared by powder blending the materials in approximately the following ratios:

| Material | Trade Name | Parts by Weight | Available From |
|---|---|---|---|
| Phenolic | FRJ-774 | 48 | Schenectady Chem. Inc. |
| Polyamide Flexibilizer | Emery 3670-D | 5 | Emery Company |
| ¼" Glass Fiber | K-832 | 42 | Owens-Corning Fiberglas |
| Graphite | Dixon 1176 | 5 | Jos. Dixon Crucible Co. |
| Mold Release | Acrawax | 0.3 | Glyco Chemicals Inc. |

EXAMPLE 2

SURFACE COMPOSITION

Phenolic resin, milled glass fiber and graphite were combined by powder-blending the materials in approximately the following ratios:

| Material | Trade Name | Parts by Weight | Available From |
|---|---|---|---|
| Phenolic resin | FRJ-774 | 48 | Schenectady Chem. Inc. |
| Polyamide Flexibilizer | Emery 3670-D | 5 | Emery Company |
| Milled Glass Fiber | Fiberglass 701B | 37 | Owens-Corning Fiberglas |
| Graphite | Dixon 1176 | 10 | Jos. Dixon Crucible Co. |
| Mold Release | Acrawax | 0.3 | Glyco Chemicals Inc. |

EXAMPLES 3 and 4

CONTROL COMPOSITIONS

In these two examples, phenolic compositions were prepared for impact and wear property comparisons with the laminated structures of the instant invention. The compositions were prepared by powder blending the materials in approximately the following ratios:

| Material | Trade Name | Parts by Weight Ex. 3 | Parts by Weight Ex. 4 | Available From |
|---|---|---|---|---|
| Phenolic resin | FRJ-774 | 48 | 48 | Schenectady Chem. Co. |
| Polyamide Flexibilizer | Emery 3670D | 5 | 5 | Emery Company |
| ¼" Glass Fiber | K-832 | 22 | 42 | Owens-Corning Fiberglas Corp. |
| Graphite | Dixon 1176 | 25 | 5 | Jos. Dixon Crucible Company |
| Mold Release | Acrawax | 0.3 | 0.3 | Glyco Chem. Inc. |

The phenolic compositions were formed into automatic transmission thrust washers approximately 2⅛inch in diameter and approximately 0.075 inch thick, having a central opening of approximately 1 11/16 inch in diameter.

EXAMPLE 5

MOLDED COMPOSITE STRUCTURE

The composite structure was formed as a pre-form by a three-step cold pressing process as follows: First, 1.0 g of the surface composition of Example 2 was placed in the mold cavity, a plunger was inserted and the composition compressed by application of 4,000 psi pressure on the plunger. Second, the plunger was removed, 4.5 g of the core composition of Example 1 was added to the mold, the plunger reinserted and pressure applied as before. As a third step, the plunger was removed, 1.0 g of the surface composition of Example 2 was added to the mold and the composite was compressed as before to form a pre-form. The cold-pressed pre-form was then removed from the pre-form mold and placed into a thrust washer mold. The mold was assembled, placed in a heated platen press, and held at 310°F. for 6 minutes under 2,000 psi pressure to form and cure the composition. After cooling, the mold was opened and the finished thrust washer was removed.

EXAMPLES 6 and 7

MOLDED CONTROL STRUCTURES

The compositions of Examples 3 and 4 were cold pressed in a single step to give 6.5 g pre-forms, which again were molded and cured as before.

All thrust washers were then post-cured by heating in an air oven at a programmed slow increase in temperature from 80° to 350°F. over an eight hour period and then holding 16 hours at 350°F. and finally gradually cooling to room temperature.

The washers were subjected to wear testing and physical property characterization. The wear test is run in oil (Texaco 10W) at 280°F. oil temperature under loads of 400 to 800 lbs. for up to three days. The thrust washer is held to a stationary steel backing plate, and a rotating mating surface made of SAE 8617H steel, having a Rockwell C hardness of 59–64 and 5–8 rms, is driven under the applied load at 1,800 rpm by a 3 HP motor. The wear is determined by measuring the thickness at 6 places, and reported as the average of the 6 measurements.

The mechanical properties and the wear properties are reported in Table I.

Table I.

| Example No. | Specimen | Test Data Physical Properties | | Wear Test | | |
|---|---|---|---|---|---|---|
| | | Impact in/lbs | Flex. Str. (psi) | Ave. T. °F. | Time (hr.) | Wear Mils |
| 5 | Composite | 6 | 19,000 | 295 | 79 | 2 |
| 6 | Control | 6 | 15,000 | 290 | 2 | 12 |
| 7 | Control | 14 | 27,000 | 300 | 74 | 26 |

It will be apparent from the test data that the including of glass fiber provides a high impact thrust washer. In Examples 6 and 7, however, where the glass fiber is distributed throughout the composition the wear properties are markedly inferior to the wear properties of the composite structure.

Further improvements in wear properties can be produced by adding other surface lubricants, or by coating the surface with lubricant compositions.

A suitable surface coating for thrust washers can be prepared from 62 parts by weight mineral spirits, 8 parts by weight polyurethane coating resin (Cargill 2255) and 30 parts by weight molybdenum disulfide. A thrust washer of the instant invention made in accordance with Example 5 was dipped in the surface coating composition and air dried. When subjected to the wear testing described above, only 1 mil of wear occurred after 75 hours at an average temperature of 295°F.

Thrust washers and similar bearings having good surface wear properties and improved impact properties are thus seen to result when prepared to have a laminated structure with a center or core comprising a phenolic resin and glass fiber composition, and outer surfaces comprising a phenolic resin, milled glass fiber, and a solid lubricant such as graphite. The wear properties are further improved by providing a surface coating containing a lubricant.

The various features of the invention have been particularly shown and described in connection with particular examples, however it will be understood that various modifications will be apparent to those skilled in the art, and the invention is to be given its fullest interpretation within the scope of the appended claims.

We claim:

1. A pre-form composite useful for making bearing structures consisting of a core or center comprising a fiber glass filled resin and at least one outer surface comprising milled fiber glass and solid lubricant filled resin.

2. The pre-form composite of claim 1 wherein the core is comprised of a phenolic resin and glass fiber, and the outer surface is comprised of a phenolic resin and milled glass fiber and solid lubricant selected from the group graphite, poly(tetrafluoroethylene), molybdenum disulfide, and mixtures thereof.

3. A pre-form composite suitable for use in bearing and thrust washer applications having improved impact and wear properties consisting of a core or center comprising from 60 to 40% by weight phenolic resin and correspondingly from 40 to 60% by weight glass fiber, and at least one outer surface comprising from 40 to 75% by weight phenolic resin, from 45 to 20% by weight milled glass fiber and 15 to 5% by weight graphite.

4. The pre-form composite of claim 3 wherein the core or center comprises from about 90 to about 50% by weight of the total composite, and the outer surface comprising correspondingly from 10 to 50% of the total composite.

5. The pre-form composite of claim 4 in the form of a thrust washer.

* * * * *